Figure 1:
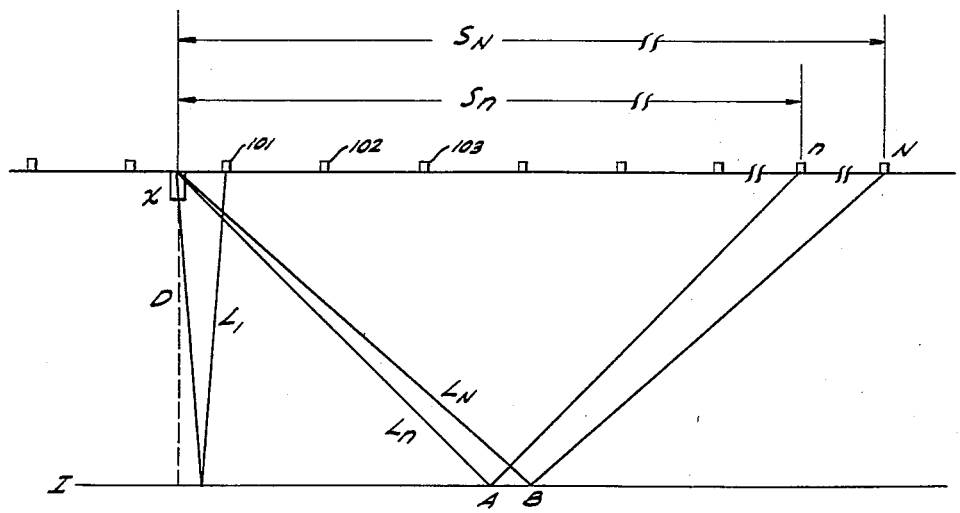

Oct. 17, 1961  C. H. SAVIT  3,005,184
METHOD AND APPARATUS FOR SEISMOGRAPHIC SURVEYING
Filed Oct. 28, 1957

INVENTOR.
CARL H. SAVIT,
BY Spensley & How
ATTORNEY.

United States Patent Office 3,005,184
Patented Oct. 17, 1961

3,005,184
METHOD AND APPARATUS FOR SEISMO-
GRAPHIC SURVEYING
Carl H. Savit, Van Nuys, Calif., assignor to Western
Geophysical Company of America, Los Angeles, Calif.,
a corporation of Delaware
Filed Oct. 28, 1957, Ser. No. 692,732
11 Claims. (Cl. 340—15)

This invention relates to geophysical exploration and more particularly to an improved method for the analysis of seismographic records of the type produced in seismographic surveying.

In the well known reflection method of making seismographic surveys it is necessary, in the analysis of the results, to eliminate, or compensate for, the normal moveout caused by the geometry of the seismographic survey apparatus. That is, by the reflection method of seismograph prospecting or surveying, a record is made of the earth's disturbance produced at a plurality of points by a detonation initiated near the earth's surface at another point termed the "shot-point." For purposes of illustration, in a common arrangement of seismographic exploratory and recording apparatus used for seismographic surveying work, a plurality of seismometer or detector groups are disposed in contact with the earth in a preferably straight line at opposed sides of the shot point. A recording unit, provided with suitable amplifying and recording means, is electrically connected to the detectors to amplify and record the electrical impulses produced by the detectors upon the arrival at each detector group, of seismographic waves generated by an explosion at the shot point and reflected by the various underground formations.

The electrical impulses produced by the detector groups are recorded by various recording methods known to the art. The results are time scale records of the seismic waves received at the detector groups. Such records most generally take the form of a plurality of parallel record traces of the vibrations as received at the several detectors. In general, the record shows waves which have traversed paths close to the earth's surface and waves which have penetrated the earth's surface and have been reflected by interfaces between two layers of different properties or characteristics. In many cases several interfaces are present at varying depths and the record will show waves reflected from each of such interfaces. Relatively large differences in time arise between the various traces, however, due to the fact that the seismic wave detectors are spaced at different distances from the location of the seismic disturbance, so that energy reflected from a given horizontal reflecting horizon arrives at the different detectors at different times, resulting in time displacements of corresponding signal portions of the different seismic traces. This time differential is well known in the art as normal moveout and is sometimes referred to as step-out or angularity. As the depth of reflection increases the time differentials required to reach the various detector groups become smaller with the time differential approaching zero as the depth of the reflector approaches infinity. Thus, the time differential or normal moveout time is maximum immediately after the disturbance when the differences in distances of the travel paths to the different detectors for energy from a given reflecting horizon are largest. The exact manner in which the normal moveout varies as a function of the time after the disturbance will depend upon the spacing of the different detectors and the particular velocity function obtained in the surveyed area. Moveout may, therefore, be defined in the present application as the difference in reflection time from a horizontal reflector between a seismometer at a distance S from the source and a seismometer at the source.

Numerous methods and apparatus have been proposed in the prior art for removing the normal moveout time variation from seismic traces. With the advent of reproducible recording in seismic prospecting, a number of methods have been proposed for removing normal moveout by effecting relative shifts in the position of the recording or reproducing means relative to the recording medium to produce relative time shifts in the recorded or reproduced traces. The problem is complicated, however, by the fact that the required normal moveout correction varies nonlinearly with respect to distance from the source and with respect to the time elapsing after the disturbance. The required correction is largest immediately after the disturbance and decreases nonlinearly with time as these differences decrease. The correction is zero at the source and increases non-linearly with increasing distance from the source. The two relationships are, furthermore, interdependent and not separable.

Accordingly, it is an object of the present invention to provide a method of adjusting data obtained by the reflection method of seismographic surveying by which the time phase relationship of seismic disturbance at detectors distributed at various distances from the shot point are accurately corrected for normal moveout.

It is another object of the present invention to provide a method of distributing a moveout correction among a plurality of seismograph traces in which the trace time of each is corrected to the order of one millisecond of error.

It is a further object of the present invention to provide a method of moveout correction for a reflection method of seismographic exploration, which corrects the seismic traces in the time and geometric region of maximum interest.

A further object of the present invention is to provide a method of introducing a relationship for time from shot and distance from shot point such that separate control and variation of each can be accomplished without varying the other.

The present invention is a method for adjusting the relative time coordinates between various detectors in a plurality of detectors positioned proximate the surface of the earth at spaced distances from a source of seismic disturbance, which method comprises adjusting the relative time coordinates of the seismic energy detected at each of the detectors such that the time coordinate adjustment increases with the distance of the detector from the source of seismic disturbance at a fixed rate greater than a linear rate and less than a rate proportional to the square of the distance.

The novel features which are believed to be characteristic of the invention, both as to its organization and method of operation, together with further objects and advantages thereof, will be better understood from the following description considered in connection with the accompanying drawing. It is to be understood, however, that the drawing is for the purpose of illustration and description only and is not intended as a definition of the limits of the invention.

Figure 2:
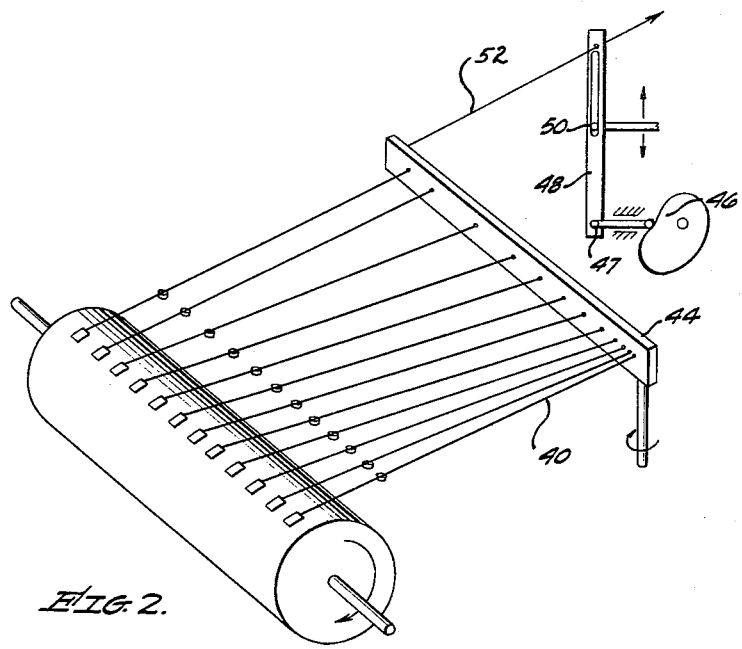

In the drawing:

FIGURE 1 is a diagrammatic representation showing a group of twelve seismographic detectors positioned to one side of a shot point for purposes of illustration; and FIGURE 2 is a diagrammatic representation of an illustrative multi-channel seismograph recording apparatus wherein relative shifts in the reproducing heads relative to the recording medium are utilized to adjust the relative time coordinates at each of the detectors in accordance with this invention.

Referring now to the drawing, the variables to be considered in the method of the present invention may be more clearly understood by reference to FIGURE 1 wherein a typical seismographic surveying field setup is shown diagrammatically to illustrate the moveout of the system. By reference to FIGURE 2 it can be shown how the method of the present invention is applied to an illustrative seismograph recording system of the type known to the art.

Referring now particularly to FIGURE 1, a plurality of seismograph detector groups are equally spaced to each side of a source of seismic disturbance shown to be the shot point X. For clarity the spaced series of detector groups is shown to one side of the shot point only since the description and method will apply equally to the series at the opposite side of the shot point. It should be noted, however, that in order to space the detector groups at equal intervals one from the other the innermost detectors are at one-half the detector spacing from the shot point. That is, if a series of twenty-four detectors are spaced equally from each other at opposite sides of the shot point, the two detectors nearest the shot point at opposite sides thereof will be spaced at one unit from the shot point and all detectors will be spaced two units from each other. Thus, in FIGURE 1, detector 101 is one unit from X at a distance designated as $S_1$; detector 102 is three units from X at a distance $S_2$; detector 103 is at five units; and so forth, with any detector $n$ at a distance $S_n$ and the outermost detector N at a distance $S_N$. A horizontal reflecting interface I is shown at depth D beneath the surface. Other arrangements of detectors are well known and commonly used in the art. Application of the present invention to such other arrangements will be readily apparent to one skilled in the art from the illustrative example presented in this description.

By means well known to the art the detectors are electrically connected to amplifiers which amplify the electrical impulses produced by the detectors upon the arrival at each detector of seismographic waves generated by the explosion at the shot point and reflected by various underground formations such as the interface I. The intensity of the electrical signal is transmitted from each detector group through the amplifiers to a time scale recording device such as a multi-channel magnetic recorder where the intensity of the signal at each detector group is magnetically recorded upon the surface of a magnetically sensitized tape which is affixed to a rotating drum, all of which is well known to the art. The record produced upon the recording medium affixed to the rotating drum is thus a time scale record of the signal intensity with the time scale $t$ introduced by the movement of the recording medium at constant speed past the recording heads. The record thus produced is, however, an uncorrected record.

The method of the present invention will be described in connection with the use of the method as applied to an illustrative apparatus in which signals are transmitted to the apparatus from an uncorrected magnetic tape recording to form a corrected tape recording. Such an apparatus is disclosed and claimed, for example, in co-pending application Serial No. 659,434, filed May 15, 1957, for Multi-Channel Recording Apparatus, by H. Salvatori et al., and assigned to the assignee of the present invention. It is to be understood, however, that the method of this invention is equally applicable to other seismograph recording systems and apparatus, such as application Serial No. 646,731 by C. Savit, filed March 18, 1957, for Oscillographic Camera, and assigned to the assignee of the present application, and to sound-on-film, ferroelectric, radio-magnetic, phonographic and other recording methods known to the art.

As shown in FIGURE 1, upon the occurrence of a seismic disturbance at the shot point X as by firing a shot, the shock waves will progress away from the shot point and will be reflected by the interface I at depth D in the earth to obtain an uncorrected record.

The reflected waves will be detected at the various detectors after traveling along wave paths indicated as L in FIGURE 1. Since these detectors are spaced from the shot point X, the path of the wave detected at any given detector $n$ comprises the two sides of an isosceles triangle, since the angle of incidence must equal the angle of reflection for the detected wave. The distance of travel of the wave is $2Ln$ and the time at which the wave is detected is $2Ln/v = t_n$ where $v$ is the velocity of the shock wave through the earth. For clarity of description it will be assumed that the velocity $v$ is constant and the interface I is horizontal. The reflection time $2D$ is seen to be equal to $t$. It is the vertical distance of reflection of each wave which is of interest and to determine the depth D of the interface, it may be seen that the length of wave travel $2L_n$ is longer than twice the vertical distance D. The resulting lag in arrival time over the time for a vertical path is due to the moveout which has been previously defined as the difference in reflection time from a horizontal reflector, between a seismometer at distance S from the source and a seismometer at the source. Thus, reflections at points A and B are from the same horizontal interface but arrive at detectors $n$ and N at different times and are so recorded on the time scale record. The moveout at detector 101 is very small since the length of the wave path is only slightly longer than a vertical reflection. However, at detector N the proportion of reflection time due to moveout is much greater due to the greater horizontal distance $S_N$. The moveout then is that proportion of the total time $t_n$ for a wave to reach a detector $n$ which is due to the horizontal distance $S_n$ and may be expressed as $$(1) \qquad M_n = \frac{2L_n}{v} - \frac{2D}{v}$$

where $M_n$ is the moveout time at any detector. It may be seen from the foregoing and by reference to FIGURE 1 that at the time of initiation of the shot the moveout time is proportionally greatest and equal to $S_n/v$. That is, the vertical distance D is zero and the total travel distance $2L_n$ to any detector is equal to the distance $S_n$. Thus, at time zero $M_n = 2L_n/v = S_n/v$ and thus is proportional to $S_n$.

As the waves are reflected from deeper interfaces it may be seen that the proportion of the reflection time due to the distance $S_n$ decreases and will approach zero as D approaches infinity since $L_n$ will approach D.

Accordingly, at and near time equal zero the maximum time scale correction is required while at relatively great time intervals the minimum correction is required. Since the moveout is non-linear and a function of two variables, i.e., $M_n = f(S_n, t)$, an approximation of the time scale correction is applied in the prior art in which the moveout correction is linearly proportional to the horizontal distance or to the square of the distance. An exact correction has also been made by use of a three dimensional cam but such cams are difficult to construct, are not interchangeable for various field setups, and must be individually prepared at great expense for each different velocity function encountered in the field.

The prior art approximation by which the moveout at various detectors is made linearly proportional to the distance of the detectors from the shot point is valid at $t$ equal zero as hereinabove indicated.

The approximation that moveout is proportional to the square of the distance S may be shown to be valid at relatively great depths as follows:

Since $$M_n = \sqrt{\frac{S_n^2}{v^2} + t^2} - t$$

then (2) $\quad M_n = t\left(\sqrt{1 + \frac{S_n^2}{v^2 t^2}} - 1\right) = F(S_n, t)$ (3) $\quad M_n = t\left(\sqrt{1 + \frac{S_n^2}{4D^2}} - 1\right)$ By the binominal theorem of Newton (4) $\quad M_n = t\left[1 + \frac{1}{2}\left(\frac{S_n^2}{4D^2}\right) - \frac{1}{8}\left(\frac{S_n^2}{4D^2}\right)^2 + \ldots - 1\right]$ provided $$\frac{S_n^2}{4D^2} < 1$$

which is true for sufficiently great values of D. Therefore, for $D \gg 0$ the higher orders may be ignored as insignificant and (5) $\quad M_n \cong \frac{1}{8} \frac{S_n^2}{D^2}$ and as $D \to \infty$ $$\lim_{D \to \infty} D^2 \frac{M_n}{S_n^2} = \frac{1}{8}$$

Thus, the linear approximation of the prior art wherein $$\frac{M_n}{M_N} = \frac{S_n}{S_N}$$

is correct at and near $t=0$ but introduces a larger error into the time scale record as depth increases and areas of interest are reached. Conversely, the approximation of the prior art wherein $$\frac{M_n}{M_N} = \frac{S_n^2}{S_N^2}$$

is correct at infinite depth but introduces appreciable errors in areas of interest. For example, a maximum error of five milliseconds may be introduced at the time of greatest interest, i.e., at $t=0.5$ second for spreads and velocities commonly encountered on the gulf coast of the United States. An error of one millisecond is a maximum normally tolerable error.

It has been empirically determined in accordance with this invention that a fixed value can be utilized by which (6) $\quad \frac{M_n}{M_N} = \frac{S_n^y}{S_N^y}$ where y is a value between 1 and 2 which will minimize the error in the time scale correction for moveout. In addition, it has been determined that a fixed set of values, which set is a function of $S_N$ can be applied to the time scale corrections for moveout which will introduce a moveout correction of minimum error for all spread lengths, velocities and depths of exploration customarily encountered in seismographic prospecting. In accordance with this invention a relationship between depth D and the maximum distance of a detector from the shot point is chosen which is representative of the depth of interest and typical spread length. In this illustrative embodiment $D = 12/13 S_N$ has been found empirically to yield excellent results. That is, for example, $S_N$ equal 1300 feet and D equal 1200 feet.

It has been shown in Eq. 3 that $$M_n = t\left(\sqrt{1 + \frac{S_n^2}{4D^2}} - 1\right)$$

Accordingly, (7) $\quad \dfrac{M_n}{M_N} = \dfrac{t\left(\sqrt{1 + \dfrac{S_n^2}{4D^2}} - 1\right)}{t\left(\sqrt{1 + \dfrac{S_N^2}{4D^2}} - 1\right)}$ and since D has been set equal to $12/13\, S_N$, $M_n$ may be set equal to (8) $\quad M_n = M_N \left[\dfrac{\sqrt{1 + \dfrac{S_n^2}{4\left(\dfrac{12}{13}S_N\right)^2}} - 1}{\sqrt{1 + \dfrac{S_N^2}{4\left(\dfrac{12}{13}S_N\right)^2}} - 1}\right]$ then (9) $\quad M_n = M_N \left(\dfrac{\sqrt{1 + \dfrac{169}{576}\dfrac{S_n^2}{S_N^2}} - 1}{\sqrt{1 + \dfrac{169}{576}} - 1}\right)$ $$= M_N \left(\dfrac{\sqrt{576 + 169\dfrac{S_n^2}{S_N^2}} - 24}{\sqrt{745} - 24}\right)$$

and $$\frac{M_n}{M_N} \cong \left(\frac{S_n}{S_N}\right)^{1.9}$$

Thus, the moveout correction to be applied in accordance with the present invention is determined such that

(10) $\quad \dfrac{M_n}{M_N} = \dfrac{\sqrt{1 + S_n^2 k} - 1}{\sqrt{1 + S_N^2 k} - 1}$ where K is set equal to $1/(4r^2 S_N^2)$ and r is a predetermined typical ratio of depth to spread length. In turn $M_n/M_N$ is approximately equal to $$\left(\frac{S_n}{S_N}\right)^y$$

where y is some value greater than 1 and less than 2.

Referring now to FIGURE 2, an illustrative means is shown for applying the above moveout correction to a seismograph recording system of the type described hereinbefore in which an uncorrected tape serves as a signal source to the apparatus used to record a corrected tape. Channel 12 of the apparatus shown corresponds to the channel of the uncorrected tape upon which the outermost detector signal was recorded. That is, the magnitude of the time scale calibration required is greatest at channel 12 and decreases at each channel with the least correction required at channel 1. Since the correction required by the horizontal time interval decreases as the time increases, the time scale corrections required for each channel decrease as the drum rotates. After sufficient time has elapsed to allow the time interval due to the horizontal distance between the detectors, as recorded upon the uncorrected tape, to become proportionally insignificant, the time scale correction for each channel can be equated to zero and the magnetic heads for all channels will be aligned. The amount of relative movement between the heads is determined by the relative position at which the head cable 40 for a given channel is affixed to the dynamic arm 44. In addition the rate of change of position is further determined by the rate at which the dynamic arm 44 is moved through the required angular distance. Thus, the dynamic time scale calibration is defined for each channel as $B_nF(t)$ where $n$ denotes any channel, $B_n$ is determined by the location of the head cable 40 on the dynamic arm 44 and $F(t)$ is determined by the rate of movement of the arm. In accordance with this invention $$B_n = \left(\frac{\sqrt{1+S_n^2 k}-1}{\sqrt{1+S_N^2 k}-1}\right) \cong \left(\frac{S_n}{S_N}\right)^y$$

where K is set equal to $1/(2rS_N)^2$ and $t$ is a predetermined typical ratio of depth to spread length. Well known mathematical or graphical methods may be used to determine the value of $y$ so as to optimize the approximation. When such optimization is performed the value of $y$ is seen to be greater than 1 and less than 2. The relationship therefore determines the relative movement between the heads which in this illustrative example is determined by the spacing of the cables upon a pivoted arm. Thus, a time phase relationship approximation is defined which will minimize the error due to moveout among detectors distributed at various distances from the shot point.

Thus, as an example of the application of the method of the present invention to an illustrative apparatus as shown schematically in FIGURE 2, the spacing of the head cables upon the dynamic arm is determined to provide the required relative movement. In an illustrative field setup the detectors are positioned such that $S_1$ is at 50 feet from the shot point X, $S_2$ is at 150 feet, $S_3$ is at 250 feet and so forth to $S_{12}$ which is at 1150 feet. If the dynamic correction arm in the illustrative apparatus is 3.00 inches in length measured from the center of rotation to the most distant head cable, in which the head cables are to be distributed; then by the determination of $B_n$ in accordance with the present invention the distance of the head cable corresponding to the detector at $S_2$ would be 0.05 inch, $S_3$ would be 0.15 inch, $S_4$ would be 0.29 inch, $S_5$ would be 0.49 inch, $S_6$ 0.72 inch, $S_7$ 1.00 inch, $S_8$ 1.32 inches, $S_9$ 1.69 inches, $S_{10}$ 2.09 inches, $S_{11}$ 2.53 inches and $S_{12}$ would be 3.00 inches.

It should be noted as discussed hereinbefore that the complete correction for moveout is defined in the relationship $T_n = t_n - A_n - B_nF(t)$, where T is the corrected time and $t_n$ is the uncorrected reflection time for trace $n$. Thus, the above relationship as given in Eq. 10 determines $B_n$ while the rate of movement is determined as a function of $t$. That is, in the illustrative example the relative movement of the reproducing heads is determined by the spacing upon the pivoted bar which spacing is determined as above. However, the rate at which the bar is rotated about its pivot is a function of $t$ and of $S_N$ and is thus dependent upon the spread length of the detectors in the seismographic field setup. So long as the spread length is maintained constant the function of $t$ which defines the rate of movement of the pivoted bar will for a given velocity function remain the same. Thus, a single cam in an apparatus such as that described in application Serial Nos. 659,434 and 646,731, supra, may be used for each velocity function and for each spread.

That is, referring to FIGURE 2, it is schematically shown that the amount of relative movement between the various magnetic heads corresponding to the detectors at various distances from the shot point, is accomplished in the illustrative apparatus by determining the spacing of the cables 40 affixed to the heads from the pivot point of the dynamic arm 44 in accordance with the relationship given hereinbefore which defines $B_n$ for minimum moveout error. In addition, the rate at which the dynamic arm 44 is moved through the required distance is determined by a dynamic correction cam 46 which imparts a movement, which is a function $F(t)$ of time $t$, to the dynamic arm 44 through a cam follower 47 and a pivoted lever arm 48. Although such apparatus is shown schematically in this application for purpose of description and clarity one form of such apparatus is shown and described in detail in co-pending application Serial No. 659,434, supra.

In accordance with this invention, however, it has been further determined that a relationship can be assigned to define $F(t)$ in the relationship $T_n = t_n - A_n - B_nF(t)$ which will yield an approximation for the rate of movement, i.e., $F(t)$ which is applicable to normal spread lengths encountered within a broad range to yield a moveout correction in which the error is minimized when coupled with $B_n$ as determined hereinbefore. Such a relationship is obtained, for example, by providing the lever arm 48 in the schematic illustrative apparatus with a variable pivot point and varying the pivot point 50 in accordance with a spread length relationship as determined hereinafter, such that the dynamic arm 44 is moved at a rate defined by $CF(t)$ where C is in turn a function of the spread length of the seismographic field setup. Thus, a single dynamic cam 46 can be utilized for different spread lengths likely to be encountered and C, a function of $S_N$, is a spread length factor which may be applied to the cam defining the appropriate function to $t$ to produce the movement required by the pivot bar for a spread length $S_N$.

C is a function of the spread length $S_N$ and can be written as $C = C(S_N)$. From Eq. 3 it has been previously shown that $$M_N = t\left(\sqrt{1+\frac{S_N^2}{4D^2}}-1\right)$$

and that $M_N$ is proportional to $S_N$ when $t = D = 0$ and $M_N$ is proportional to $S_N^2$ when $t$ is much greater than 0.

It has been determined by means of this invention that a good approximation to $M_N$ can be made by setting $M_N = C(S_N)$, $\overline{M_N}$ can be made by setting $M_N = C(S_N)\overline{M_N}$ where $\overline{M_N}$ is the normal moveout for the spread $\overline{S_N}$ and $\overline{S_N}$ is a typical spread length to be used and is somewhat less than the maximum to be encountered for an area of operations. The relationship of normal moveout ($M_N$) to a given spread length ($S_N$) at any given fixed depth is fixed and known. If, as a specific example a depth of 1200 feet and a spread length of 1300 feet is used as typical, the relationship can be established and will be the same, for example, at a depth of 2400 feet and a spread length of 2600 feet. Furthermore, by use of the relationship of the present invention, the cam designed for a typical spread length of 1300 feet will be applicable for spread lengths of 500 feet to 600 feet.

Thus, $\overline{S_N}$ is chosen in this example, to be 13/16 of $S_{NM}$ where $S_{NM}$ is the maximum spread length for which the cam can be used. Then $$C(S_N) = \frac{\sqrt{1+\left(\frac{S_N}{\overline{S_N}}\frac{13}{2\times 12}\right)^2}-1}{\sqrt{1+\left(\frac{13}{2\times 12}\right)^2}-1} = \frac{\sqrt{1+\frac{169}{576}\left(\frac{S_N}{\overline{S_N}}\right)^2}-1}{\sqrt{\frac{745}{576}}-1}$$

Therefore, by inserting the proper spread length $S_N$ for a given field application a numerical value of $C(S_N)$ is determined and it should be noted that in the said example $C(\overline{S_N}) = 1.000$ and $C(S_{NM}) = 1.4705$. The cam is then built to read not $F(t)$ determined for the spread $\overline{S_N}$, but $1.4705\, F(t)$ so that the proportionality constant in the machine is $$\frac{C\left(\frac{\overline{S_N}}{S_{NM}}\right)}{C}$$

and thus is always less than 1.

Thus, in the illustrative apparatus of FIGURE 2, the pivot bar 48 may be indexed such that at 1600 feet in the example the pivot 50 is midway between the cam follower 47 and the actuating cable 52 and the pivot may be moved to the appropriate point as shown on the index determined by the above relationship to give a correct rate of movement for any given spread length.

Thus, the present invention provides a method of moveout correction whereby the relationship of $T_n = t_n - A_n - B_n F(t)$ is transformed to the relationship $T_n = t_n - A_n - B_M C(S_N) F(t)$ to apply a moveout correction to seismograph traces in which the trace time is corrected to the order of one millisecond of error in the time and velocity region of maximum interest. Such correction is obtained by determining $B_n$ in the above relationship such that $$B_n = \frac{\sqrt{1+S_n^2 K}-1}{\sqrt{1+S_N^2 K}-1} \cong \left(\frac{S_n}{S_N}\right)^y$$

where $K$ is set equal to $1/(2rS_N)^2$ and $y$ is any value greater than 1 and less than 2. In addition, $C(S_N)$ is a spread length factor which can be applied to the function of $t$ introduced by means such as a dynamic correction cam to make such cam applicable to various spread lengths likely to be encountered in the seismographic survey field setup.

What is claimed is:

1. In the method of seismic surveying in which a plurality of detectors are spaced proximate the surface of the earth at varying distances from a source of seismic disturbance, the method of adjusting the time-phase relationship of seismic energy detected at said detectors comprising: distributing the time-phase correction at each of said detectors in proportion to a fixed relationship of the distance of each detector from the source, which relationship is between a value which is linearly proportional to said distance and a value which is proportional to the square of said distance.

2. In the method of seismic surveying in which a plurality of detectors are spaced proximate the surface of the earth at varying distances from a source of seismic disturbance, the method of adjusting the time-phase relationship of seismic energy detected at said detectors comprising: distributing the time phase correction at each of said detectors in proportion to a fixed relationship of the distance of each detector from the source, which relationship is substantially in accordance with the distribution of correction determined by the formula $$\frac{M_n}{M_N} = \left(\frac{\sqrt{1+S_n^2 K}-1}{\sqrt{1+S_N^2 K}-1}\right)$$

where $K = 1/(2rS_N)^2$, $M_n$ is the moveout correction at any detector $n$, $M_N$ is the moveout correction at the outermost detector $N$, $S_n$ is the horizontal distance of detector $n$ from the source, $S_N$ is the horizontal distance of detector $N$ from the source, $r$ is a typical ratio of depth of interest to horizontal distance of interest.

3. In the method of seismic surveying in which a plurality of detectors are spaced proximate the surface of the earth at varying distances from a source of seismic disturbance, the method of adjusting the time-phase relationship of seismic energy detected at said detectors comprising: distributing the time-phase correction at each of said detectors substantially in proportion to a fixed relationship of the distance of each detector from the source, which relationship is substantially in accordance with the distribution of correction determined by the formula $$\frac{M_n}{M_N} = \left(\frac{S_n}{S_N}\right)^y$$

where $y$ is any value between 1 and 2.

4. In seismic surveying in which a plurality of detectors are spaced proximate the surface of the earth at varying distances from a source of seismic disturbance; apparatus for adjusting the time phase relationship of seismic energy detected at said detectors and transmitted as seismic detector signals comprising: a reproducible recording medium having a time scale; a plurality of reproducing means movable relative to said medium along said time scale for reproducing said signals; a rotatable body; connecting means for connecting said reproducing means to said rotatable body at spaced apart points along a radius of said body, said points being spaced at distances $B_n$ from the axis of rotation of said body substantially according to the relationship $$B_n = \left(\frac{\sqrt{1+S_n^2 K}-1}{\sqrt{1+S_N^2 K}-1}\right)$$

where $K = 1/(2rS_N)^2$, $S_n$ is the horizontal distance of detector $n$ from the source, $S_N$ is the horizontal distance of the outermost detector $N$ from the source, and $r$ is a predetermined ratio of depth to horizontal distance; and means for rotating said body.

5. In seismic surveying in which a plurality of detectors are spaced proximate the surface of the earth at varying distances from a source of seismic disturbance; apparatus for adjusting the time phase relationship of seismic energy detected at said detectors and transmitted as seismic detector signals comprising: a reproducible recording medium having a time scale; a plurality of reproducing means movable relative to said medium along said time scale for reproducing said signals; a rotatable body; cables connecting said reproducing means to said rotatable body at spaced apart points along a radius of said body, said points being spaced at distances $B_n$ from the axis of rotation of said body according to the relationship $$B_n = \left(\frac{\sqrt{1+S_n^2 K}-1}{\sqrt{1+S_N^2 K}-1}\right)$$

where $K = 1/(2rS_N)^2$, $S_n$ is the horizontal distance of detector $n$ from the source, $S_N$ is the horizontal distance of the outermost detector $N$ from the source, and $r$ is a predetermined ratio of depth to horizontal distance; and means for rotating said body at a predetermined rate $CF(t)$ where $C$ is a function of the spread length of the detectors and $F(t)$ is a function of time $(t)$.

6. In an apparatus for seismic surveying having a plurality of groups of detectors spaced proximate the surface of the earth at varying distances from a source of seismic disturbance, a reproducible recording medium having a time scale, and a plurality of reproducing means movable relative to said medium along said time scale for reproducing said signals, each of said reproducing means corresponding to a specified group of detectors; means for adjusting the time-phase relationship of seismic energy detected at said detectors and transmitted as seismic detector signals comprising: motion distributing means; connecting means connecting said reproducing means to said motion distributing means, said motion distributing means being constructed and arranged to distribute motion among said reproducing means substantially according to the relationship $$B_n = \left(\frac{\sqrt{1+S_n^2 K}-1}{\sqrt{1+S_N^2 K}-1}\right)$$

where $B_n$ is the relative motion of the $n$th reproducing means, $K = 1/(2rS_N)^2$, $S_n$ is the horizontal distance of the $n$th detector from the source, $S_N$ is the horizontal distance of the outermost detector $N$ from the source, and $r$ is a predetermined ratio of depth to horizontal distance; and means for actuating said motion distributing means.

7. In an apparatus for seismic surveying having a plurality of groups of detectors spaced proximate the surface of the earth at varying distances from a source of seismic disturbance, a reproducible recording medium having a time scale, and a plurality of reproducing means movable relative to said medium along said time scale for reproducing said signals, each of said reproducing means corresponding to a specified group of detectors; means for adjusting the time-phase relationship of seismic energy detected at said detectors and transmitted as seismic detector signals comprising: motion distributing means; connecting means connecting said reproducing means to said motion distributing means, said motion distributing means being constructed and arranged to distribute motion among said reproducing means substantially according to the relationship $$B_n = CF(t)\left(\frac{\sqrt{1+S_n^2 K}-1}{\sqrt{1+S_N^2 K}-1}\right)$$

where $B_n$ is the relative motion of the $n$th reproducing means, $K=1/(2rS_N)^2$, $S_n$ is the horizontal distance of the $n$th detector from the source, $S_N$ is the horizontal distance of the outermost detector $N$ from the source, $C$ is a function of the spread length of the detectors, $F(t)$ is a function of time $t$, and $r$ is a predetermined ratio of depth to horizontal distance; and means for actuating said motion distributing means.

8. In an apparatus for seismic surveying having a plurality of groups of detectors spaced proximate the surface of the earth at varying distances from a source of seismic disturbance, a reproducible recording medium having a time scale, and a plurality of reproducing means movable relative to said medium along said time scale for reproducing said signals, each of said reproducing means corresponding to a specified group of detectors; means for adjusting the time-phase relationship of seismic energy detected at said detectors and transmitted as seismic detector signals comprising: motion distributing means; connecting means connecting said reproducing means to said motion distributing means, said motion distributing means being constructed and arranged to distribute motion among said reproducing means substantially according to the relationship $B_n/B_N=(S_n/S_N)^y$ where $B_n$ is the motion of the $n$th reproducing means, $B_N$ is the motion of the $N$th reproducing means, $S_n$ is the horizontal distance of the $n$th detector from the source, $S_N$ is the horizontal distance of the outermost detector $N$ from the source, and $y$ is a predetermined number greater than 1 and less than 2; and means for actuating said motion distributing means.

9. In an apparatus for seismic surveying having a plurality of groups of detectors spaced proximate the surface of the earth at varying distances from a source of seismic disturbance, a reproducible recording medium having a time scale, and a plurality of reproducing means movable relative to said medium along said time scale for reproducing said signals, each of said reproducing means corresponding to a specified group of detectors; means for adjusting the time-phase relationship of seismic energy detected at said detectors and transmitted as seismic detector signals comprising: motion distributing means; connecting means connecting said reproducing means to said motion distributing means, said motion distributing means being constructed and arranged to distribute motion among said reproducing means substantially according to the relationship $$B_n = CF(t)B_N(S_n/S_N)^y$$

where $B_n$ is the relative motion of the $n$th reproducing means, $B_N$ is the motion of the $N$th reproducing means, $S_n$ is the horizontal distance of the $n$th detector from the source, $S_N$ is the horizontal distance of the outermost detector $N$ from the source, $C$ is a function of the spread length of the detectors, $F(t)$ is a function of time $t$, and $y$ is a predetermined number greater than 1 and less than 2; and means for actuating said motion distributing means.

10. In an apparatus for seismic surveying having a plurality of groups of detectors spaced proximate the surface of the earth at varying distances from a source of seismic disturbance, a reproducible recording medium having a time scale, and a plurality of reproducing means movable relative to said medium along said time scale for reproducing said signals, each of said reproducing means corresponding to a specified group of detectors; means for adjusting the time-phase relationship of seismic energy detected at said detectors and transmitted as seismic detector signals comprising: motion distributing means; connecting means connecting said reproducing means to said motion distributing means, said motion distributing means being constructed and arranged to distribute motion among said reproducing means according to the relationship that the ratio of the motion of the $n$th reproducing means to the motion of the $N$th reproducing means remain constant for the duration of a predetermined portion of the said time scale and that the said ratio is equal to the ratio of the moveout determined at the $n$th group of detectors to the moveout determined at the $N$th group of detectors at a predetermined time, said predetermined time being later than the time of the first arrival of seismic energy at said detectors and earlier than the time of the effective end of the seismographic recording, where $N$ represents the detector group at the greatest distance from the source of seismic disturbance and $n$ represents a detector group intermediate between the said source and the said $N$th group.

11. In an apparatus for seismic surveying having a plurality of groups of detectors spaced proximate the surface of the earth at varying distances from a source of seismic disturbance, a reproducible recording medium having a time scale, and a plurality of reproducing means movable relative to said medium along said time scale for reproducing said signals, each of said reproducing means corresponding to a specified group of detectors; means for adjusting the time-phase relationship of seismic energy detected at said detectors and transmitted as seismic detector signals comprising: motion distributing means; connecting means connecting said reproducing means to said motion distributing means, said motion distributing means being constructed and arranged to distribute motion among said reproducing means according to the relationship that the ratio of the motion of the $n$th reproducing means to the motion of the $N$th reproducing means remain constant for the duration of a predetermined portion of the said time scale and that the said ratio is equal to the ratio of the moveout determined at the $n$th group of detectors to the moveout determined at the $N$th group of detectors, said ratio of moveouts being determined for a reflection at a predetermined depth substantially below the surface of the earth and within the range of depths to be explored, where $N$ represents the detector group at the greatest distance from the source of seismic disturbance and $n$ represents a detector group intermediate between the said source and the said $N$th group.

References Cited in the file of this patent

UNITED STATES PATENTS

| | | |
|---|---|---|
| 2,440,971 | Palmer | May 4, 1948 |
| 2,765,455 | Meiners | Oct. 2, 1956 |
| 2,800,639 | Lee | July 23, 1957 |
| 2,810,898 | Meiners | Oct. 22, 1957 |
| 2,967,291 | Carlisle | Jan. 3, 1961 |